United States Patent
Rust, Jr.

[11] 3,879,256
[45] Apr. 22, 1975

[54] APPARATUS FOR VIBRATION WELDING OF SHEET MATERIALS

[75] Inventor: Edgar C. Rust, Jr., Williamstown, Mass.

[73] Assignee: Crompton & Knowles Corporation, New York, N.Y.

[22] Filed: Dec. 21, 1972

[21] Appl. No.: 317,460

[52] U.S. Cl. .................. 156/580; 156/73; 228/1
[51] Int. Cl. ....................... B06b 3/00; B23k 1/06
[58] Field of Search ........ 156/580, 73; 264/68, 248; 425/174.2; 228/1, 44; 226/196, 198, 199

[56] References Cited
UNITED STATES PATENTS

| | | | |
|---|---|---|---|
| 3,556,912 | 1/1971 | Burgo et al. | 156/580 |
| 3,720,558 | 3/1973 | Menzie et al. | 156/199 |
| 3,726,747 | 4/1973 | Zottu | 156/580 |
| 3,733,238 | 5/1973 | Long et al. | 156/580 |

*Primary Examiner*—Charles E. Van Horn
*Assistant Examiner*—M. G. Wityshyn

[57] ABSTRACT

Apparatus for welding thermoplastic sheet-like elements wherein two rows of staggered vibration transmitting members engage one side of the sheet-like elements against anvils located on the other side of said sheet-like elements to produce welds therebetween. Means are provided to advance the sheet-like elements between the anvils and vibration transmitting members, and compression members are located in the spaces between members in the first row of vibration transmitting members with which said sheet-like elements come into contact for maintaining the sheet-like elements uniformly flat across the width thereof.

9 Claims, 3 Drawing Figures

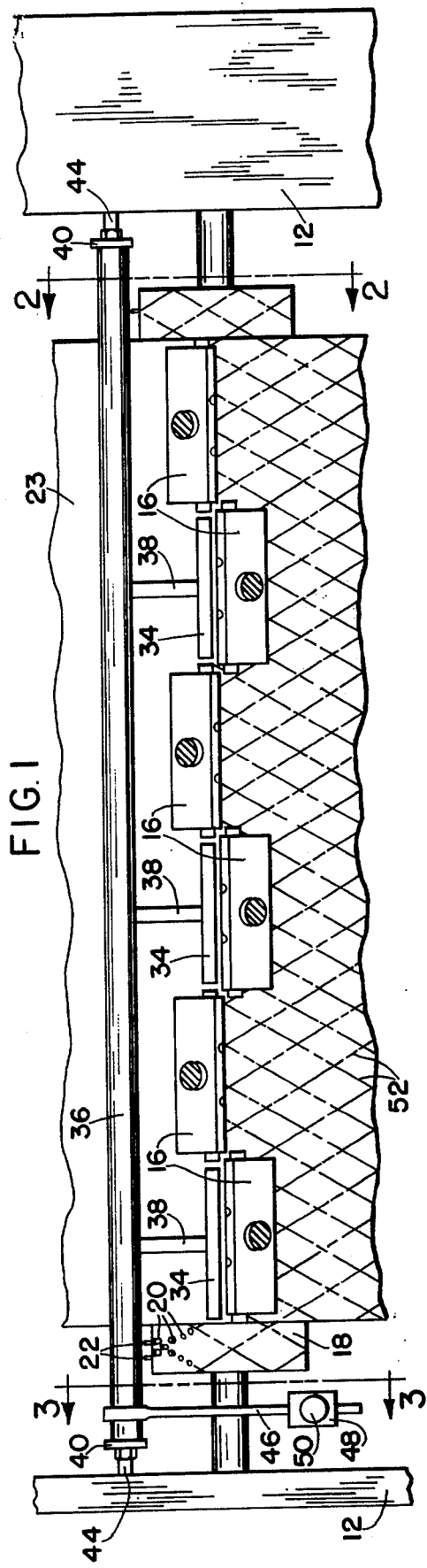
FIG.1
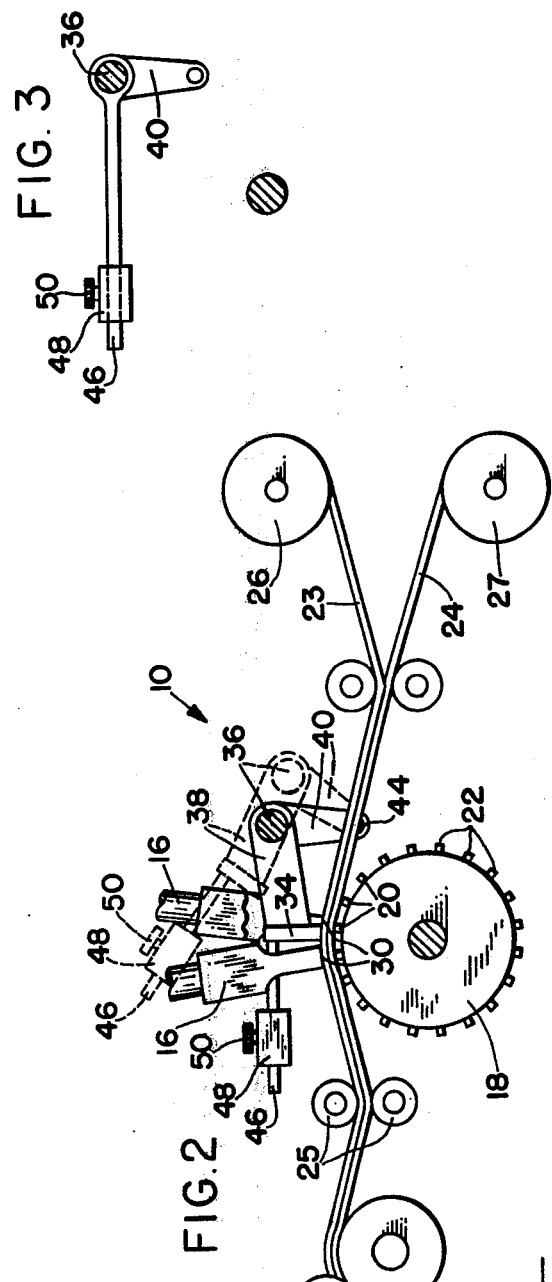
FIG.3
FIG.2

APPARATUS FOR VIBRATION WELDING OF SHEET MATERIALS

BACKGROUND OF THE INVENTION

This invention relates to mechanism for welding thermoplastic sheet material by the use of ultrasonic vibration transmitting members and anvils to produce a laminated fabric for use in upholstery, blankets, table covers, sleeping bags and many other articles.

The material to be welded is conveyed between the vibration transmitting members and the anvils. There are practical limitations to the working length of the vibration transmitting members so that several members have to be employed substantially end to end as disclosed in my co-pending application Ser. No. 207,322, filed jointly with Delmar Long and Stanley Lawrence, and now U.S. Pat. No. 3,733,238. As disclosed in this co-pending application, the vibration transmitting members are arranged in staggered fashion into two rows across the width of the sheet-like elements to prevent the members from touching and being damaged. The members of one row overlap the members of the other row so that each member can be spaced from adjacent members and yet every point across the entire width of the sheet-like elements is engaged by at least one member as the sheet-like elements advance through the welding area.

One problem which arises from the mechanism described above is that the sheet-like elements may pucker in the area between vibration transmitting members when the material reaches the first row thereof. When this puckered area is subsequently welded by the vibration transmitting members in the second row, the excess material which was between the members of the first row is forced to the edges of the welded areas and forms folds or seams which are welded into the material.

SUMMARY OF THE INVENTION

It is a general object of this invention to provide means for eliminating the above described problem of unwanted folding or seaming in the fabric.

The object of the invention is accomplished by providing compression members between vibration transmitting members in the first row thereof which engages the sheet-like elements. The compression members are spaced from the vibration transmitting members and are effective to maintain the sheet-like elements uniformly flat across the entire width thereof along the longitudinal axis of the first row of vibration transmitting members.

It is a further object of the invention to provide means for varying the pressure of the compression members and also for making them of a non-metalic material which will not damage the vibration transmitting members and is of a substantially fireproof material in the event that a compression member accidentially touches one of the vibration transmitting members.

BRIEF DESCRIPTION OF THE DRAWINGS

FIG. 1 is a fragmentary planned view of a vibration welding apparatus embodying the present invention;

FIG. 2 is a section on line 2—2 of FIG. 1, looking in the direction of the arrows; and FIG. 3 is a section on line 3—3 of FIG. 1 looking in the direction of the arrows.

DETAILED DESCRIPTION OF THE INVENTION

Referring to Figures, the ultrasonic vibration welding apparatus is generally indicated by the reference numeral 10 including supporting framework 12.

Mounted within framework 12 are ultrasonic vibration transmitting members 16 and anvil means which may take a variety of forms but which in this case includes a roll 18 having a series of projections 20 arranged in a pattern. Roll 18 is supported within framework 12 and is rotatably driven by conventional drive means, not shown. The projections 20 have outer surfaces 22 which cooperate with working surfaces 30 of vibration transmitting members 16 to produce welds in thermoplastic material placed therebetween.

The material to be joined by welding are sheet-like elements indicated at 23 and 24 which are drawn through the welding area between members 16 and roll 18 by a pair of takeup rolls 25, respectively. Sheets 23 and 24 are superimposed as they pass through the welding zone and are collected as a laminated product on a roll 28.

At least one of the sheets 23 and 24 must contain thermoplastic material. The term "thermoplastic material" as used in this application includes materials which are 100% thermoplastic as well as blends of thermoplastic and non-thermoplastic materials.

Vibration transmitting members 16 are arranged in two rows extending across the width of elements 23 and 24, with alternate members being offset in the direction of travel of the elements as shown in FIG. 1. Members 16 are spaced from each other but overlap slightly so that they collectively cover the entire width of elements 23 and 24.

In accordance with the present invention, compression members 34 are positioned between members 16 in the first row thereof in compressive engagement with sheet 23. Compression members 34 are spaced from vibration transmitting member 16 but are preferably made of a non-metalic, non-combustible material to prevent damage to the members 16 or combustion to the members 34 in the event that members 16 and 34 might accidentally touch. A reinforced phenolic resin is a material which meets these conditions.

Members 34 are supported from an elongated connector 36 by brackets 38. Connector 36 extends across the entire width of the machine and is supported between levers 40 which are pivoted at 44 at opposite ends of the machine to framework 12.

An arm 46 is attached to connector 36 near one end thereof and extends from rod 36 in the same direction as members 34. A weight 48 is slidably mounted on arm 46 for increasing the pressure of members 34 against sheet-like elements 23 and 24. Weight 48 can be locked, as by a screw 50, into any position along the arm to vary the amount of pressure exerted by members 34. Compression members 34 will be in their operative positions as shown in the full line position in FIG. 2 wherein weight 48 will exert its substantially greatest influence in maintaining members 34 against element 23 and 24. When members 34 are in this full line position, elements 23 and 24 will be maintained uniformly flat throughout their widths as they are drawn under the first row of vibration transmitting members 16. The portions of elements 23 and 24 which extend between members of the second row of members 16 will not pucker since these portions will have been welded together by the members 16 of the first row. The weld spots will appear along dot and dash lines 52 in FIG. 1.

Members 34 can be lifted out of active position by raising arm 46 to the dotted line position as shown in FIG. 2. In this position, levers 40 extend rearwardly from their pivots 44 so that members 34 will remain in their raised position. This permits visual inspection of the areas between members 16.

I claim:

1. Apparatus for joining two or more sheet-like elements, at least one of which contains a thermoplastic material comprising:
   a. a frame;
   b. means to advance the sheet-like elements to be joined from a source of supply;
   c. a plurality of spaced ultrasonic vibration transmitting members mounted within said frame, each having a working surface in contact with one side of said sheet-like elements, each member being offset from adjacent members in the longitudinal direction of said sheet-like elements to form at least first and second parallel rows of vibration transmitting members, said rows extending along axes which are transverse to the longitudinal axis of said sheet-like elements;
   d. anvil means mounted within said frame and located on the other side of said sheet-like elements for cooperating with said working surfaces; and
   e. Compression members spaced from, and located between, the transmitting members of the first row of said vibration transmitting members, which row is the first vibration transmitting members to come in contact with said sheet-like elements during the operation of said advancing means, said members being in compressive engagement with said sheet-like elements along the longitudinal axis of said first row for maintaining said sheet-like elements substantially uniformly flat across the entire width thereof.

2. The apparatus as described in claim 1 wherein said compression members are mounted for movement into and out of contact with said sheet-like elements.

3. The apparatus as described in claim 2 comprising means for varying the pressure of said compression members against the sheet-like elements.

4. The apparatus as described in claim 3 wherein the means for varying the pressure of said compression members comprises an arm and a weight slidably mounted on said arm, said arm being operatively connected to said compression members so that the pressure exerted by said compression members against said sheet-like elements will vary in accordance with the position of the weight on said arm.

5. The apparatus as described in claim 2 wherein said compression members are swingably mounted from a stationary pivot for movement into and out of contact with said sheet-like elements.

6. The apparatus as described in claim 2 wherein the mounting means for said compression members comprises:
   a. a pair of levers pivotally mounted to said frame at opposite ends of said rows of vibration transmitting members;
   b. a connector extending between said levers and connected to said levers at points spaced from the pivot points of said levers; and
   c. supporting brackets for rigidly connecting said compression members to said connector.

7. The apparatus as described in claim 6 comprising:
   a. an arm fixed to said connector and extending therefrom in the same direction as said compression members; and
   b. a weight slidably mounted on said arm for varying the amount of pressure of said compression members on said sheet-like elements in accordance with the position of said weight on said arm.

8. The apparatus as described in claim 1 wherein said compression members are of a nonmetallic fire-resistant material.

9. The apparatus as described in claim 8 wherein said material is reinforced phenolic resin.

* * * * *